United States Patent
Simons

(10) Patent No.: US 11,418,341 B2
(45) Date of Patent: *Aug. 16, 2022

(54) DISTRIBUTED CONSENT PROTECTING DATA ACROSS SYSTEMS AND SERVICES

(71) Applicant: AMERICORP INVESTMENTS LLC, Denver, CO (US)

(72) Inventor: Jordan Simons, Denver, CO (US)

(73) Assignee: Americorp Investments LLC, Denver, CO (US)

(*) Notice: Subject to any disclaimer, the term of this patent is extended or adjusted under 35 U.S.C. 154(b) by 159 days.

This patent is subject to a terminal disclaimer.

(21) Appl. No.: 16/874,787

(22) Filed: May 15, 2020

(65) Prior Publication Data

US 2020/0280443 A1    Sep. 3, 2020

Related U.S. Application Data

(63) Continuation of application No. 16/400,790, filed on May 1, 2019, now Pat. No. 10,749,676.

(Continued)

(51) Int. Cl.
*H04L 9/32* (2006.01)
*G06Q 30/02* (2012.01)
(Continued)

(52) U.S. Cl.
CPC ......... *H04L 9/321* (2013.01); *G06Q 30/0236* (2013.01); *H04L 9/0637* (2013.01); *H04L 9/3231* (2013.01); *H04L 67/1097* (2013.01)

(58) Field of Classification Search
CPC .............................. H04L 63/12; H04L 63/321
See application file for complete search history.

(56) References Cited

U.S. PATENT DOCUMENTS 9,935,772 B1   4/2018 Madisetti et al.
10,135,835 B1 * 11/2018 Kandel ................. H04L 63/102
(Continued)

OTHER PUBLICATIONS

Xia, Q., Sifah, E.B., Smahi, A., Amofa, S. and Zhang, X., 2017. BBDS: Blockchain-based data sharing for electronic medical records in cloud environments. Information, 8(2), p. 44. (Year: 2017).*

(Continued)

*Primary Examiner* — James R Turchen
(74) *Attorney, Agent, or Firm* — Ortiz & Lopez, PLLC; Luis M. Ortiz; Kermit D. Lopez

(57) ABSTRACT

Non-limiting examples of the present disclosure relate to generation and implementation of a new security protocol that is used to secure common data access transactions across distributed network examples. An exemplary proof of verification protocol is disclosed that implements consensus security mechanisms across a plurality of distributed nodes, which may be utilized to validate owners of data in common data access transactions. Extending principles of blockchain security to common data access transactions and Internet of Things (IoT) networking requires a solution that: improves speed in transactional processing; reduces computational complexity; and presents efficient, secure and repeatable validation for owners of data in distributed networking environments. An exemplary proof of verification protocol provides such technical advantages by validating both user-specific data for a subscriber of an application/service and session data for user activity (past and present) within the application/service.

20 Claims, 4 Drawing Sheets

Related U.S. Application Data

(60) Provisional application No. 62/665,436, filed on May 1, 2018.

(51) Int. Cl.
 *H04L 9/06* (2006.01)
 *H04L 67/1097* (2022.01)

(56) References Cited

U.S. PATENT DOCUMENTS

| | | | |
|---|---|---|---|
| 2011/0167440 | A1 | 7/2011 | Greenfield |
| 2014/0359280 | A1 | 12/2014 | Saboor et al. |
| 2015/0332283 | A1 | 11/2015 | Witchey |
| 2018/0288022 | A1* | 10/2018 | Madisetti ............ G06Q 20/3829 |
| 2019/0130701 | A1* | 5/2019 | Simons ................. H04L 9/0637 |
| 2019/0166133 | A1* | 5/2019 | Frederick .............. H04L 9/3239 |
| 2019/0327081 | A1* | 10/2019 | Ow ...................... G06F 21/6245 |
| 2021/0218745 | A1* | 7/2021 | Firnkorn ............... H04L 9/3239 |

OTHER PUBLICATIONS

International Application No. PCT/US2019/030242, International Search Report & Written Opinion, 9 pages, dated Jul. 29, 2019.

Orbs, "Public Blockchain Infrastructure For Established Consumer Applications," Position Paper V1.7, 91 pages, Aug. 2017.

Ouaddah, Aafaf et al., "FairAccess: A New Blockchain-Based Access Control Framework For the Internet of Things," Security and Communication Networks, vol. 9, pp. 5943-5964, 2016.

Xu, Lei et al., "DL-BAC: Distributed Ledger Based Access Control For Web Applications," 2017 International World Wide Web Conference Committee, pp. 1445-1450, Apr. 3-7, 2017.

Yu, Fei Richard et al., "Virtualization For Distributed Ledger Tecnology (vDLT)," IEEE Access, vol. 6, pp. 25019-25028, Apr. 23, 2018.

* cited by examiner

100

DISTRIBUTED CONSENT PROTECTING DATA ACROSS SYSTEMS AND SERVICES

CROSS-REFERENCE TO RELATED APPLICATIONS

This application is a continuation of U.S. patent application Ser. No. 16/400,790 filed May 1, 2019, which claims priority to U.S. Provisional Application Ser. No. 62/665,436 filed May 1, 2018, which are incorporated herein by reference in their entireties for all purposes.

TECHNICAL FIELD

Various embodiments of the present technology generally relate to data security. More specifically, some embodiments of the present invention relate to distributed consent protecting data across system and services.

BACKGROUND

Data security is a paramount concern at the forefront of developing systems used to large scale access to data. Every day, it seems that we hear about another data breach or hack of a centralized database where confidential user data is compromised. In other instances, companies are selling user data for profit often without the knowledge of the user. The concept of using blockchain to add security to network transactions has become increasingly desirable since the successful use of blockchain as security for financial transactions such as cryptocurrencies.

Blockchain is designed as basis for applications/services that involve transactions and interactions such as the execution of business/financial transactions and smart contracts, among other examples. Blockchain is an encrypted ledger that records a list of individual transactions within a business process. Security for blockchain is implemented through a blockchain protocol that enables devices to participate in blockchain transactions and defines how security is implemented to validate those transactions. The existence of many different blockchain protocols suggests that blockchain security may be extended to protect data in many different types of applicable scenarios.

Theoretically, a blockchain security layer can be added to any system/service model to secure transactions happening over a distributed network. However, in actual execution, it becomes very difficult to implement blockchain security common data transactions and concepts like the Internet of Things (IoT). This may be because existing blockchain protocols, including proof theorems for validating transactions, are not designed for common data access transactions. For example, Bitcoin implements a proof-of-work protocol and other blockchain based models may utilize a proof-of-stake protocol for validating transactions through computer nodes that mine cryptocurrency. As such, the present disclosure is directed to bridging the technical gap between applying blockchain security concepts to common data access transactions.

SUMMARY

In view of the foregoing technical shortcomings, non-limiting examples of the present disclosure relate to generation and implementation of a new security protocol that is used to secure common data access transactions across distributed network examples. An exemplary proof of verification protocol is disclosed that implements consensus security mechanisms across a plurality of distributed nodes, which may be utilized to validate owners of data in common data access transactions. Extending principles of blockchain security to common data access transactions and Internet of Things (IoT) networking requires a solution that: improves speed in transactional processing; reduces computational complexity; and presents efficient, secure and repeatable validation for owners of data in distributed networking environments. An exemplary proof of verification protocol provides such technical advantages by validating both user-specific data for a subscriber of an application/service and session data for user activity (past and present) within the application/service.

Embodiments of the present technology also include computer-readable storage media containing sets of instructions to cause one or more processors to perform the methods, variations of the methods, and other operations described herein.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

Figure 1:
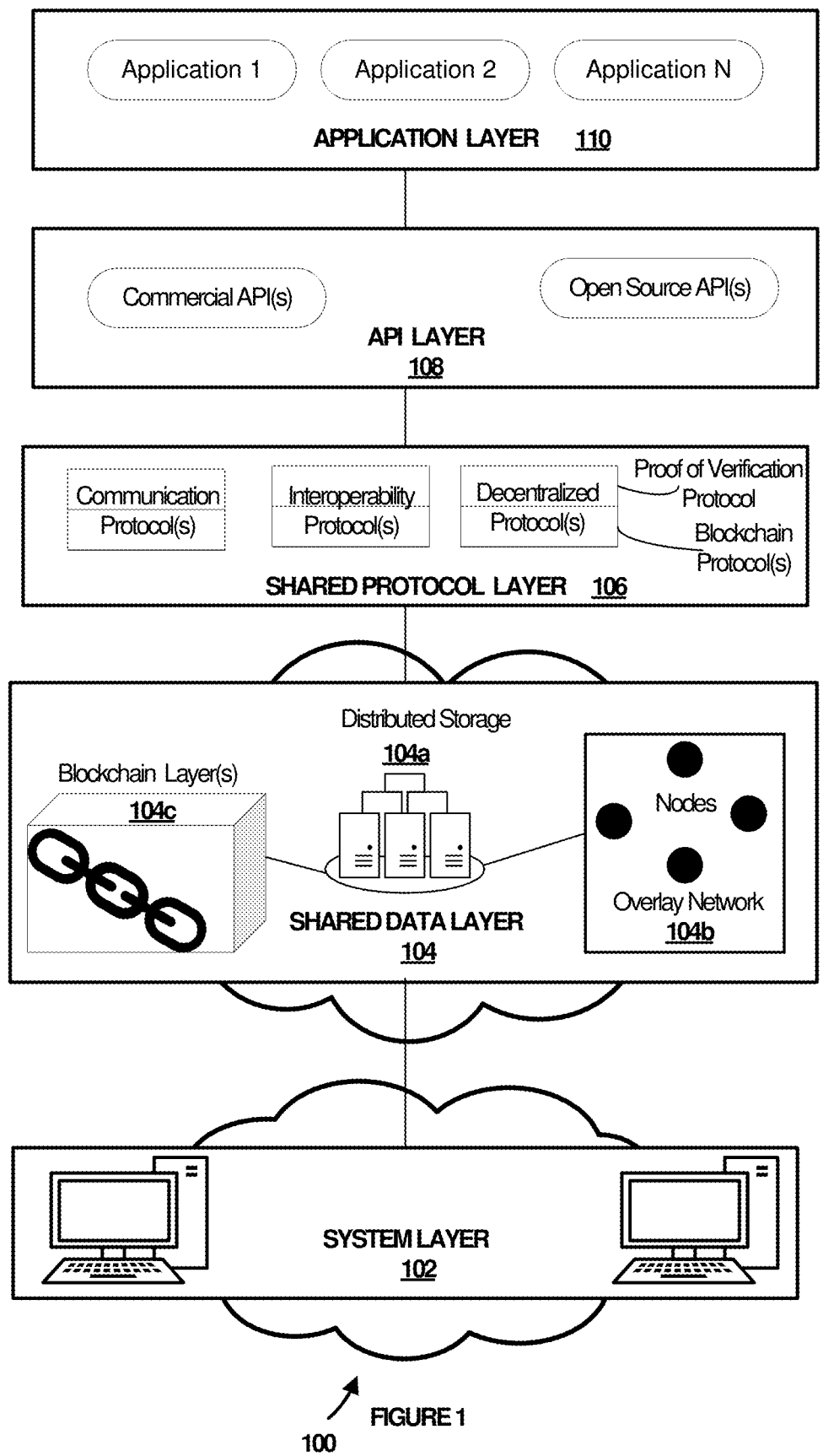
FIG. 1 illustrates a layer diagram illustrating exemplary layers for a distributed data storage system, with which aspects of the present disclosure may be practiced.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Non-limiting examples of the present disclosure relate to generation and implementation of a new security protocol that is used to secure common data access transactions across distributed network examples. An exemplary proof of verification protocol is disclosed that implements consensus security mechanisms across a plurality of distributed nodes, which may be utilized to validate owners of data in common data access transactions. Extending principles of blockchain security to common data access transactions and Internet of Things (IoT) networking requires a solution that: improves speed in transactional processing; reduces computational complexity; and presents efficient, secure and repeatable validation for owners of data in distributed networking environments. An exemplary proof of verification protocol provides such technical advantages by validating both user-specific data for a subscriber of an application/service and session data for user activity (past and present) within the application/service.

Examples described herein extend to validation of any common data access transactions, where the proof of verification protocol may be used to validate an owner of data before a transaction is granted. Common data access transactions may comprise but are not limited to: transactions that request access to user data, transactions that request sharing of user data, transactions that request transfer of ownership of user data, transactions that request redemption of currency or rewards associated with a user account, transactions that modify user data and transactions that monitor user activity/application data, among other examples. The present disclosure pertains to common data transactions across any industry including network and telecommunication, online gaming, social networking, banking and financing, consumer product management and management of personally identifiable information (PII), among different industry types. In some examples, exemplary proof of verification processing is used to validate what may be considered new common data access transaction requests, which do not attempt to alter a record of a distributed ledger of previously validated transactions. If a subsequent request is received to retroactively alter a block of the distributed ledger, an exemplary blockchain layer implements a blockchain protocol to prevent retroactive alterations to data of validated transactions. For instance, upon generation of a block, cryptographic hashing is used to lock blocks of the distributed ledger. Attempts to alter a created block (in distributed ledger) would result in a new hash being generated that would not match the hashing in that block or subsequently generated hashes from that block. Proof of verification processing may further be applicable as an alternative or supplement to other proof protocols such as proof-of-work and proof-of-stake, among other examples.

The present disclosure is applicable to any distributed networking (e.g., cloud-computing network) instances where data is managed in a decentralized manner. Examples described herein apply to IoT examples such as instances where a number of smart devices are connected to manage data and operations in a close geographic proximity (e.g., home). Exemplary proof of verification processing may be utilized to validate data access transactions including control of a specific smart device in an IoT network. In another example, an entity may establish a distributed storage that stores data, which can be accessed via a network connection. The distributed storage is managed across a plurality of nodes, which may be virtualized computing nodes. The plurality of nodes, or a separate set of (virtualized) computing nodes, may manage validation of common data access transactions with respect to data that is stored across the distributed storage. A proof of verification protocol is applied to validate propriety of access to data for any of the described common data access transactions. Stored data may be encrypted to add an additional layer of security however access application of the proof of verification focuses on access request to the data. A distributed ledger is utilized to manage recordation of all validated common data access transactions. In some examples, an exemplary distributed ledger may be managed internally by a specific entity, company, business, etc., for example, for records management and auditing purposes. Additionally, the distributed ledger may be accessible to manager of protected data, for example, a subscriber (e.g., user) of an application/service who creates or own user data. In such instances, subscribers may access a record of common access data transaction relating to their user data.

Exemplary proof of verification processing implements consensus security mechanisms across a plurality of distributed nodes, which may be utilized to validate owners of data in common data access transactions. A plurality of computing nodes (e.g., virtual machines/virtual nodes) may collectively execute a consensus determination as to a validity of a data access transaction. In order to validate a common data access transaction, the plurality of computing nodes needs to reach a consensus that the request for access is valid. As an example, a consensus is reached when the plurality of nodes determines that the evaluated aspects of subscriber data and session data are each valid. In addition to the computing nodes being decentralized, the process of assigning computing nodes to evaluate different aspects in proof of verification processing may randomize the computing nodes among active and authorized nodes. This may act as a measure to help limit success during an unauthorized access attempt. Moreover, during proof of verification processing, specific aspects of evaluation may be randomized so that validation determinations are not successive and predictable.

It is to be understood that conditions for determining a consensus may vary according to developer specifications without departing from the spirit of the present disclosure. In alternative examples, a consensus threshold may be achieved, which validates a request, when a majority of the computing nodes validate respective portions of the proof of verification evaluation. In some instances, different validation aspects may be given greater weighing than other aspects of validation. For instance, an exemplary protocol may specify that evaluation of subscriber data counts more than a specific evaluation of session data, which leads to a majority determination that a data request is valid.

During implementation of proof of verification processing, a computing node, of the plurality of virtual nodes, may be assigned to execute a first type of validation such as validation of subscriber data. Subscriber data pertains to a user account associated with an application/service, where the subscriber is the owner or manager of the exemplary user data involved in the common data access transaction. Exemplary validation of subscriber data may comprise validation of a security token associated with a subscriber of an application/service. An exemplary security token may store one or more cryptographic keys associated with a subscriber such as public and/or private keys, a digital signature or biometric data associated with the user, among other examples. In some less strict instances, examples of a security token may further extend to passwords/passcodes provided by the subscriber.

Simultaneous with a computing node executing validation of subscriber data, multiple other computing nodes, of the plurality of virtual nodes, may be configured to validate session data associated with access to an exemplary application/service. Session data relates to access to an exemplary application/service by the subscriber, where an evaluation of session data comprises evaluation of a current session of an application/service that is being accessed by a subscriber.

More than one computing node, of the plurality of nodes, may be utilized to evaluate session data. In doing so, individual nodes may randomly evaluate different aspects of session data. Examples of ways in which session data is evaluated comprise but are not limited to: multi-factor authentication of the subscriber through one or more computing devices (or modalities) of the subscriber that are registered with an exemplary application/service; comparing geo-locational data associated with a request in a current session with current geo-locational data of a registered computing device of the subscriber; matching characteristics of a current session with characteristics from previous sessions (through log data associated with previous subscriber access to the application/service and validating a nonce value associated with an active session of the application/service, among other examples.

One practical application example that the present disclosure addresses are the instances where business entities collect and transact (i.e. sell) user data collected from applications/services. In the present examples, decentralized management of user data enables individual users to own their data and delegate access and usage of their own data for common data access transactions. For instance, when the data is to be accessed, used, sold, etc., applications/services would confirm the use with the individual user to prevent unauthorized use of user data. To incentive users to share, users can be provided with rewards for sharing data. For instance, rewards may be in-application awards or even currency based (e.g., monetary compensation, cryptocurrency). This may be useful in online gaming instances to not only protect user data but also enable reward access and perks for sharing data (e.g., that may be used for advertising or telemetric analysis). Additionally, an exemplary digital ledger may be used to maintain a history of data transactions of a subscriber. As an example, this data may be encrypted and accessible, for a subscribe, in a distributed and decentralized manner and on-demand.

Another practical application example is an IoT system, for example, that is in a home of a person. A user may register a number of smart devices that may be connected and used to manage different electronic devices within a home. For instance, say that a user's HVAC system is being controlled by a smart device, where the user has set a schedule for the system to operate. If a request comes in for a change to that schedule (e.g., user remotely accesses or a hack of the IoT system is being initiated), then the proof of verification protocol (and consensus determination) can be used to validate that the user is making the request and the system is not compromised. An exemplary distributed ledger may be maintained for any validated transactions. As an example, this distributed ledger may be used to identify valid patterns in user activity and manage associated smart devices.

Yet another practical application of proof of verification processing is an online gaming instance that users have ownership over in-game items, skills, powers, abilities, etc. Gamers may desire to cash in earned credits, currency, etc., to modify a character, gameplay mode, etc., or even trade ownership, within a gaming environment, with other players. An exemplary proof of verification protocol may be used to validate such in-game data transactions. Furthermore, validated transactions may be recorded in an exemplary distributed ledger to help keep track of in-game ownership, finance and account, specific game characters, gameplay progress and gameplay modes, among other examples.

Exemplary technical advantages provided by processing described in the present disclosure including but are not limited to: generation and implementation of an exemplary proof of verification security protocol that applies to common data access transaction; improved security for system and services examples including IoT systems, where efficient, secure and repeatable validation may occur for owners of data in distributed networking environments; reduction in computational complexity through virtualized validation of an exemplary subscriber; an exemplary consensus evaluation that provides a consolidated and consistent dataset with reduced errors, near-real-time reference data, and the flexibility for participants to change the descriptions of the assets they own; improved transparency in data access transactions; and improved processing efficiency (e.g., better resource management) in distributed networking environments, among other examples.

In the following description, for the purposes of explanation, numerous specific details are set forth in order to provide a thorough understanding of embodiments of the present technology. It will be apparent, however, to one skilled in the art that embodiments of the present technology may be practiced without some of these specific details.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

FIG. 1 illustrates a layer diagram 100 illustrating exemplary layers for a distributed data storage system, with which aspects of the present disclosure may be practiced. Layer diagram 100 illustrates a layered architecture implementing a that comprises security for common data access transactions across a distributed network. Exemplary layers described herein are arranged in a hierarchical arrangement such that lower layers (e.g., system layer 102) provide functions and services that support functions and services of higher layers (e.g., application layer 110). An exemplary distributed storage system may be implemented for decentralized storage of data (including user data), which may correspond with execution of one or more applications/services and an Internet of Things (IoT) platform, among other examples. The IoT is a system of interrelated computing devices, mechanical and digital machines, objects, animals or people that are provided with unique identifiers and the ability to transfer data over a network without requiring human-to-human or human-to-computer interaction. A distributed data storage is a computer network where data is stored across more than one node (e.g., a plurality of computing nodes). In the distributed data storage, nodes are connected over a network connection (e.g., cloud-computing networking). The distributed data storage system may comprise a stack of layers as illustrated in layer diagram 100. An exemplary distributed storage may be used to manage any type of data including user data (e.g., data created or owned by a user of application/service), data for user activity and application data (including subscriber data and session data) for an application/service, among other examples.

Figure 4:
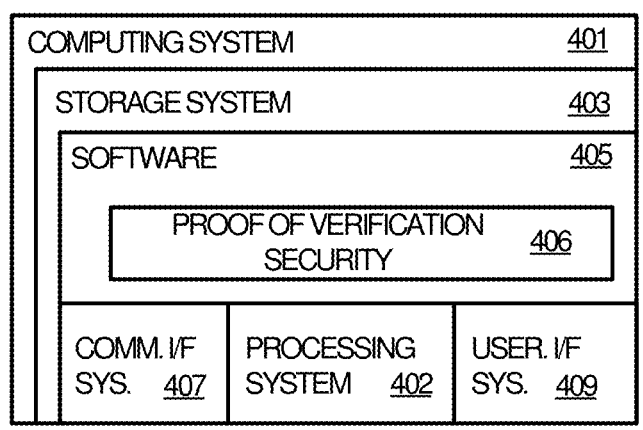
FIG. 4 illustrates a computing system suitable as a node for implementation of proof of verification processing, with which aspects of the present disclosure may be practiced.

As an example, components of layer diagram 100 may be executed by an exemplary computing system (or computing systems) as described in the description of FIG. 4. Interfacing and communication between exemplary components, such as those described in process flow 100, are known to one skilled in the field of art. Exemplary components, described in layer diagram 100, may be hardware and/or software components, which are programmed to execute processing operations described herein. In one instance, processing operations described in layer diagram 100 may be implemented by one or more components connected over a distributed network. Operations performed in layer diagram 100 may correspond to operations executed by a system and/or service that execute computer programs, software agents, virtual machine application and virtual network functions (VNFs) programming interfaces (APIs), neural networks or machine-learning processing, language understanding processing, search and filtering processing, and generation of content for presentation through a user interface of an application/service, among other examples.

A first layer of the virtual data storage system is system layer 102. An exemplary system layer 102 is a physical layer that comprises computing devices configured to enable physical electronic components to build a distributed network system (e.g., distributed data storage system) that manages data for one or more exemplary applications/services. Additional layers of the distributed data storage system are built upon the system layer 102. As an example, components of system layer 102 may comprise computing devices such as exemplary computing system (or computing systems) as described in the description of FIG. 4. Exemplary electronic devices and configuration of such devices for network-enabled connection are known to one skilled in the field of art. The system layer 102 may have direct interaction with an exemplary shared data layer 104, which may be connected over a distributed network connection (e.g., cloud computing configuration). As an example, shared data layer 104 may comprise management of a distributed storage 104a, where exemplary nodes for management of a distributed storage 104a may be physical computing nodes of a system layer 102 or virtual nodes (e.g., virtual machines) operating on one or more computing devices of the system layer 102.

As referenced above, the layered architecture, illustrated in layer diagram 100, comprises an exemplary shared layer 104. A shared data layer 104 provides node-to-node transfer of data in a networking environment. The shared data layer 104 is built on top of the system layer 102 and physical computing devices thereof. An exemplary shared data layer 104 comprises: a distributed storage 104a, an overlay network 104b (or overlay networks) and one or more blockchain layers 104c. Components of the shared data layer 104 separate data storage from service logic. This exemplary configuration enables a fully virtualized, distributed, and strongly secured data layer providing a foundation for interfacing with applications/services.

A distributed data storage 104a is a computer network where data is stored across more than one node (e.g., a plurality of computing nodes). In the distributed data storage 104a, nodes are connected over a network connection (e.g., cloud-computing networking). An exemplary distributed storage may be used to manage any type of data including user data (e.g., data created or owned by a user of application/service), data for user activity and application data for an application/service (including subscriber data, session data device state data and policy data), among other examples. An exemplary distributed data storage 104a may comprise a plurality of storage directories, where user data, that is being accessed in common data access transactions, may be stored separately from data that is used to validate transactions such as exemplary subscriber data and exemplary session data). The shared data layer 104 enables stored data to be made available to computing nodes, for example, to execute exemplary proof of verification processing for validation of common data access transactions as described herein.

The shared data layer 104 further comprises an overlay network 104b. An exemplary overlay network 104b is a computer network that is built on top of the system layer 102. One or more overlay networks may be configured to work with examples of the present disclosure. In one example, the overlay network 104b comprises a series of computer nodes that are virtualized (e.g., virtual machine computing nodes). For instance, an exemplary overlay network 104b implements a virtual network function (VNF) configuration, where software executing on virtual nodes is decoupled from underlying hardware (of the system layer 102). In implementing virtualized nodes, an exemplary system may comprise one or more virtualization layers for interfacing between the system layer 102 and a plurality of virtual nodes. Virtualization processing and implementation of virtualization layers is known to one skilled in the field of art. In alternative examples, computer nodes, implemented by an overlay network 104b, may be physical computing nodes.

Exemplary virtualized nodes, implemented through the overlay network 104b, may be optimized for cloud-based computing through stateless operation. A stateless protocol may be implemented that moves exemplary subscriber data and exemplary session data into a distributed data storage 104a. As referenced above, an exemplary distributed data storage 104a further stores exemplary user data. User data may be any data that is created and/or owned by a subscriber (e.g., user of an application/service) as well as any data collected with regard to user activity with an application/service. Exemplary subscriber data pertains to a user account associated with an application/service. For example, a user may register with an application/service, where subscriber data pertains to user account identification. Exemplary subscriber data may comprise security tokens that are utilized for verification of an identity of a subscriber. An exemplary security token may store one or more cryptographic keys associated with a subscriber such as public and/or private keys, a digital signature or biometric data associated with the user, among other examples. In some less strict instances, examples of a security token may further extend to passwords/passcodes provided by the subscriber. Moreover, specific user computing devices may be registered with an exemplary application/service, where such user computing devices may be linked to a user account of the subscriber. As referenced in the foregoing description, registered user computing devices may be utilized during proof of verification processing to validate common data access transactions relating to user data in validation of either subscriber data or session data.

Figure 2:
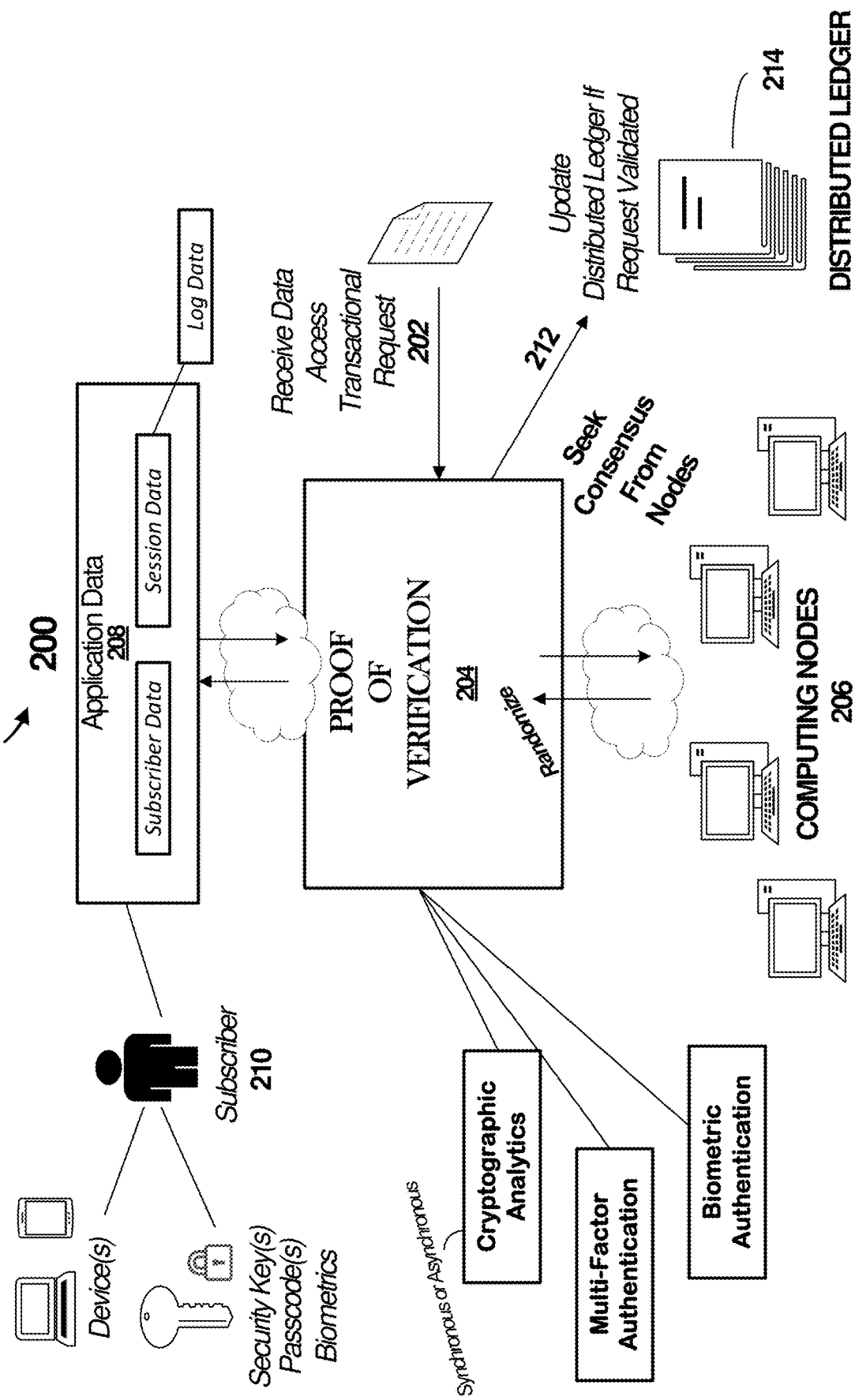
FIG. 2 illustrates a process flow for exemplary proof of verification processing, with which aspects of the present disclosure may be practiced.

Exemplary session data relates to access to an exemplary application/service by the subscriber, where an evaluation of session data comprises evaluation of a current session of an application/service that is being accessed by a subscriber. A current session is active access to an application/service by a subscriber. Log data associated with user access to an application/service may be collected and analyzed, for example, during proof of verification processing. During proof of verification processing, aspects of a current session (e.g., current or active log data) may be evaluated independently or in comparison with related aspects identified from previous sessions of access (e.g., previous log data) by the subscriber. Examples of characteristics from session data that may be used during proof of verification processing have been referenced in the foregoing and are also subsequently described in the description of process flow 200 (FIG. 2).

In the shared data layer 104, virtualized nodes may be configured to access the subscriber data and the session data during proof of verification processing implemented through a proof of verification protocol. Moreover, in terms of management and redundancy, an exemplary shared data layer 104 enables simplification of distributed network (e.g., cloud) operations, as well as allowing for easier upgrades, scaling and failovers as compared with traditional centralized storage configurations. For example, should one virtual node fail or suffer an error, another virtual node is able to be activated and immediately access the same data held in the shared data layer 104 to maintain a seamless service. Furthermore, an exemplary shared data layer 104 enables more efficient and seamless integration of new applications/services as compared with traditional centralized storage configurations. Data held by the shared data layer 104 is accessible through a family of virtual nodes connected via industry standard protocols. Consolidating data into one layer also makes that data easily available through standard interfaces, for example, for data analytics and access by third-party applications/services. Exemplary virtual nodes may be secured through security protocols, including encryption of data transmissions, as known to one skilled in the field of art. Some network functions, implemented across the plurality of virtual nodes, may be managed and scaled using service-chaining as known to one skilled in the field of art.

Additionally, the shared data layer 104 comprises one or more blockchain layers 104c. An exemplary blockchain layer 104c is configured to implement blockchain security for management of common data accesses transactions. Blockchain provides an encrypted and decentralized ledger that records a list of individual transactions within a business process. Security for blockchain is implemented through a blockchain protocol that enables devices to participate in blockchain transactions and defines how security is implemented to validate those transactions. In some examples, a single blockchain layer may be implemented to provide sufficient security for common data access transactions.

In further examples, more than one blockchain layer may interface creating interoperability of block chains (e.g., creation of multiple private blockchains) to enhance privacy, confidentiality and capability of anonymity for users. The blockchain layer(s) 104c is configured to implement a distributed ledger that may be utilized for tracking of validated common data access transactions. The distributed ledger is decentralized and built using a linked list, or chain of blocks, where each block data on validated common data access transactions that were validated by the network. An exemplary proof of verification protocol (e.g., consensus determination via a plurality of nodes) is further utilized to extend the blockchain protocol, where the proof of verification protocol regulates the behavioral of nodes in the network and determination with respect to validation of data transactions. A decentralized ledger, as opposed to the centralized one, does not require any central body or middleman to verify the common data access transactions. The trust is instead put in the network through proof of verification processing, which makes the ledger immutable and practically impossible to manipulate. Since there is no single point of failure in the blockchain, the distributed data storage system can survive catastrophic events.

In some examples, an exemplary distributed ledger may be managed internally by a specific entity, company, business, etc., for example, for records management and auditing purposes. For instance, a distributed ledger may be managed through a private blockchain. When data moves out of proprietary systems onto open blockchains, having the data itself is no longer a competitive advantage. Interpreting the data becomes the advantage. In other instances, the distributed ledger may be accessible to manager of protected data, for example, a subscriber (e.g., user) of an application/service who creates or owns the data. In such instances, subscribers may access a record of common access data transaction relating to their user data. Exemplary blocks within the distributed ledger may be encrypted. Proof of verification processing may be used to validate that the subscriber approves data access requests to their user data. Only validated common data access transactions are added to the distributed ledger.

In execution, an exemplary block may correspond with a validated common data access transaction. In another instance, an exemplary block may correspond to a plurality of common data access transactions that may be associated with a subscriber granting access. For instance, multiple requests may be made for more than one entity to access user data, where the requests are grouped for the subscriber to validate. Another example of multiple requests may come from the same entity, where an entity may request access to user data as well as distribution of the user data. In any such cases, a block may correspond with validation of the multiple requests.

An exemplary block defines the common data access transaction with data that comprises but is not limited to: the subscriber; access granted (including permissions to use data in a specific way); modification of user data or application data; timestamp data; restrictions on usage (e.g., time, permission-wise); parties involved who are receiving access; financial data (including rewards, transfer of ownership, redemption of rewards, currency); and cryptographic hash values, which may comprise: a hash value for the validation and a hash value from a previous validated block of the distributed ledger, among other examples. Without departing from the spirit of the present disclosure, it is to be understood that data stored in an associated block of the distributed ledger may vary depending on the type of application/service that is being implemented as well as the financial implications associated with a data access transaction.

Additionally, the blockchain layer(s) 104c provides an additional security element against retroactive changes to the distributed ledger. Exemplary hash values associated with blocks of the distributed ledger also serve as the links in an exemplary blockchain, where each block includes the previous block's unique hash. Cryptographic hashing with a distributed ledger, as known to one skilled in the field of art, provides immutability for the distributed ledger. For example, say that a subscriber has approved an entity for view-only access to data and the transaction is validated. In that continued example, say the entity attempts, without authorization from the subscriber, to manipulate the record to retroactively make it appear that the subscriber granted distribution access of the data to the entity. In such an instance, a new hash value would be created for a modification of that block. In this case, the hash values for the transaction records would not match and the change would not be validated. Even if there was a way to retroactively manipulate the hash value associated with a specific block, that entity would have to calculate a new hash not only for that specific block but also for every subsequent block. This would have to be done faster than the other nodes can add new blocks to the chain (e.g., the distributed ledger), which appears to be almost impossible.

The layered architecture, illustrated in layer diagram 100, further comprises an exemplary shared protocol layer 106. A shared protocol layer 106 sits on top of the shared data layer 104. The shared protocol layer 106 may comprise a protocol stack that includes protocols that define communication of components of the distributed data storage system (and network). Exemplary protocols for system operation and communication are known to one skilled in the art. For example, the shared protocol layer 106 may comprise one or more exemplary communication protocols, utilized by the virtual data storage system comprise, that comprise but are not limited to, the Internet protocol (IP, IPv4, IPv6, etc.), the transfer control protocol (TCP), cloud computing protocol and the user datagram protocol (UDP), as well as any other suitable communication protocol, variation, or combination thereof.

Furthermore, the shared protocol layer 106 may comprise one or more interoperability protocols. An exemplary interoperability protocol enables interfacing between applications/services and/or security mechanisms such as blockchain security. In one example, an exemplary interoperability protocol can be programmed and implemented to define interoperability of different blockchains, for example, to enable verticalization of blockchains. The interoperability protocol can enable interfacing of different private blockchains, public blockchains, and/or hybrid blockchains. This may enable additional layers of security to be implemented in an exemplary system/service (e.g., distributed data storage system) as well as enable an exemplary proof of verification protocol to be implemented across different types of applications/services. For instance, an application layer or software development kit (SDK) layer may be built upon the shared protocol layer 106, which may create interoperability of block chains while keeping data and metadata private and confidential (with capability of anonymity). Any type of applications/service may be built upon the infrastructure described in layered diagram 100.

Additionally, the shared protocol layer 106 may comprise one or more decentralized protocols, which may provide rulesets for defining validation of transactions, and management of a distributed ledger. An exemplary decentralized protocol is a blockchain protocol that is configured to secure an exemplary distributed ledger, for example, where cryptographic hashing is utilized to secure data of the distributed ledger. Blockchain protocol processing for management and security of a distributed ledger is known to one skilled in the field of art. Further as references above, more than one blockchain protocol may be implemented in examples described herein.

An exemplary proof of verification protocol (e.g., consensus determination via a plurality of nodes) is further utilized to extend the blockchain protocol 9s), where the proof of verification protocol regulates the behavioral of nodes in the network and determination with respect to validation of common access data transactions. Exemplary proof of verification processing implements consensus security mechanisms across a plurality of distributed nodes, which may be utilized to validate owners of data in common data access transactions. A plurality of computing nodes (e.g., virtual machines/virtual nodes) may collectively execute a consensus determination as to a validity of a data access transaction. In order to validate a common data access transaction, the plurality of nodes needs to reach a consensus that the request for access is valid. Consensus ensures that versions of shared ledgers are exact copies and lowers the risk of fraudulent transactions as well as unauthorized usage of user data because tampering would have to occur across many places at exactly the same time. Cryptographic hashes, such as the SHA256 computational algorithm, ensure that any alteration to transaction input results in a different hash value being computed, which indicates potentially compromised transactional input. During validation of a new data transaction request, exemplary security tokens (e.g., digital signatures) ensure that transactions are validated by authorized subscribers (signed with private keys) and not imposters.

Furthermore, when making consensus determinations, nodes used in validation further may be randomized to evaluate session data associated with a subscriber. This provides an additional layer of security and complexity, for example, in an event where a security token is compromised or where a hacking attempt aims to focus on a specific node. A consensus is reached (in exemplary proof of verification processing) when the plurality of nodes determines that the evaluated aspects of subscriber data and session data are each valid. In addition to the computing nodes being decentralized, the process of assigning computing nodes to evaluate different aspects in proof of verification processing may randomize the computing nodes among active and authorized nodes. Further details relating to rules associated with the proof of verification protocol are described in process flow 200 (FIG. 2), which details process flow for proof of verification processing.

The layered architecture, illustrated in layer diagram 100, further comprises an exemplary an exemplary application programming interface (API) layer 108. An exemplary API layer 108 is configured to enable developers to build on top of and connect with protocols of the exemplary distributed data storage system. The API layer 108 presents a connection for developers to build software applications that interface with an exemplary distributed data storage system as described herein. The API layer 108 is further utilized to assist with synchronization of data across services even in instances where services are in different domains. An exemplary API layer 108 comprises data that defines method of communications between software components. The API layer 108 is configured to provide consistency in network objects and resources that may exist across a plurality of underlying applications/services. Exemplary APIs that may be integrated with the distributed data storage system comprise but are not limited to: commercial APIs and open source APIs. Implementation of an API layer 108 is known to one skilled in the field of art.

An exemplary application layer 110, of the layered architecture, provides a consumer-facing part of a system infrastructure for the exemplary distributed data storage system. Applications/services may interact with the distributed data storage system through the application layer 110, which provides services that directly support operation of applications/services (e.g., application 1, application 2 . . . application N). Exemplary services for application/service support as well as integration and management of an application layer 110 is known to one skilled in the field of art. As an example, the application layer 110 provides an abstraction layer specifying shared communications protocols and interface methods used by hosts to communicate across a network connection. The application layer 110 provides programmed code that implements desired functionality of application/services. An exemplary application layer 110 is comprised of any number of digital vendors that support the functionality of a service (e.g., application 1, application 2 . . . application N). Applications/services, implemented through an exemplary application layer 110, may interface with the distributed data storage system through the API layer 108.

FIG. 2 illustrates a process flow 200 for exemplary proof of verification processing, with which aspects of the present disclosure may be practiced. Processing operations, relating to proof of verification processing, as described in process flow 200 may be executed by components of exemplary layers described in layer diagram 100 (FIG. 1).

Process flow 200 begins at operation 202, where a data access transactional request is received. A data access transaction request may be received through an exemplary application/service. An application/service may interface with an exemplary distributed data storage system as described in the foregoing description, where the application/service may be of any type including but not limited to: Internet of Things, productivity software and related services, online gaming, telecommunications, social networking, banking and financing, consumer product management, file storage systems and messaging, among other examples. Processing for issuing requests and responses through applications/services (and associated protocols) is known to one skilled in the field of art.

An exemplary request may be for a common data access transaction. As described in the foregoing, common data access transactions may comprise but are not limited to: transactions that request access to user data, transactions that request sharing of user data, transactions that request transfer of ownership of user data, transactions that request redemption of currency or rewards associated with a user account, transactions that modify user data and transactions that monitor user activity/application data, among other examples. User data may be any data that is created and/or owned by an exemplary subscriber as well as any data collected with regard to user activity with an application/service. Subscriber data pertains to a user account associated with an application/service, where the subscriber 210 is the owner or manager of the exemplary user data involved in the common data access transaction. An exemplary subscriber 210 may be in possession of cryptographic and biometric devices (e.g., security tokens such as private keys, digital signatures; passcodes, biological characteristics for biometric analysis), which can be authenticated during proof of verification processing. Additionally, a subscriber 210 may be in possession of one or more computing devices (e.g., user computing devices) that the subscriber may register with an application/service. User computing devices may be used to access an application/service as well as utilized during multi-factor authentication of a common data access transaction that involves the subscriber 210. Examples of user computing devices may further comprise smart devices, for example, within a home, office, vehicle, etc., of the subscriber 210.

Exemplary proof of verification processing is used to validate common data access transaction requests, which do not attempt to alter a record of a distributed ledger of previously validated transactions. If a subsequent request is received to retroactively alter a block of the distributed ledger, an exemplary blockchain layer implements a blockchain protocol to prevent retroactive alterations to data of validated transactions. Proof of verification processing may further be applicable as an alternative or supplement to other proof protocols such as proof-of-work and proof-of-stake, among other examples.

As process flow 200 continues, operation 204 comprises analyzing a received data access transactional request through proof of verification processing. Exemplary proof of verification processing may be implemented over a distributed network system (e.g., distributed data storage system) via a proof of verification protocol. An exemplary proof of verification protocol has been described in the foregoing description, where a proof of verification protocol provides technical advantages related to security and scalability (for usage in different system/service examples) by validating both user-specific data for a subscriber of an application/service and session data for user activity (past and present) within the application/service.

In operation 204, exemplary proof of verification processing implements consensus security mechanisms across a plurality of distributed nodes, which may be utilized to validate owners of data in common data access transactions. A plurality of computing nodes 206 (e.g., virtual machines/virtual nodes) may collectively execute a consensus determination as to a validity of a data access transaction. In order to validate a common data access transaction, the plurality of computing nodes 206 needs to reach a consensus that the request for access is valid. To validate a data transaction through consensus, an exemplary proof of verification protocol directs a plurality of computing nodes (e.g., virtual nodes/virtual machines) to evaluate application data 208 associated with an application/service. Exemplary application data 208 comprises subscriber data and session data. As referenced in the foregoing description, exemplary session data may comprise log data pertaining to previous sessions of subscriber access, which may be compared with data of a current session of a subscriber during validation of session data associated with a common data access transaction.

As an example, a consensus is reached when the plurality of computing nodes 206 determines that the evaluated aspects of subscriber data and session data are each valid. In addition to the computing nodes 206 being decentralized, the process of assigning computing nodes to evaluate different aspects in proof of verification processing may randomize the computing nodes 206 among active and authorized nodes. This may act as a measure to help limit success during an unauthorized access attempt. Moreover, during proof of verification processing, specific aspects of evaluation may be randomized so that validation determinations are not successive and predictable.

It is to be understood that conditions for determining a consensus may vary according to developer specifications without departing from the spirit of the present disclosure. In alternative examples, a consensus threshold may be achieved, which validates a request, when a majority of the computing nodes 206 validate respective portions of the proof of verification evaluation. In some instances, different validation aspects may be given greater weighing than other aspects of validation. For instance, an exemplary protocol may specify that evaluation of subscriber data counts more than a specific evaluation of session data, which leads to a majority determination that a data request is valid.

During implementation of proof of verification processing, a computing node, of the plurality of computing nodes 206, may be assigned to execute a first type of validation such as validation of subscriber data. Subscriber data pertains to a user account associated with an application/service, where the subscriber is the owner or manager of the exemplary user data involved in the common data access transaction. An exemplary computing node may be randomly assigned from the plurality of computing nodes 206, by the proof of verification protocol, to execute validation of subscriber data associated with a subscriber of the user data.

Exemplary validation of subscriber data may comprise validation of a security token associated with a subscriber of an application/service. An exemplary security token may store one or more cryptographic keys associated with a subscriber such as public and/or private keys, a digital signature or biometric data associated with the user, among other examples. In some less strict instances, examples of a security token may further extend to passwords/passcodes provided by the subscriber. That is, evaluation of subscriber data may comprise application of one or more of: cryptographic analytics and biometric authentication. Exemplary cryptographic analysis may comprise evaluation application of synchronous or asynchronous cryptography to validate an identity of a subscriber. In one instance, an exemplary hash is created using a cryptographic private key, which is used to validate the identity of the subscriber. Exemplary biometric authentication comprises confirmation of biological characteristics of the subscriber to verify the identity of the subscriber.

Simultaneous with a computing node executing validation of subscriber data, multiple other computing nodes, of the plurality of computing nodes 206, may be configured to validate session data associated with access to an exemplary application/service. Session data relates to access to an exemplary application/service by the subscriber, where an evaluation of session data comprises evaluation of a current session of an application/service that is being accessed by a subscriber. A current session is active access to an application/service by a subscriber. Log data associated with user access to an application/service may be collected and analyzed, for example, during proof of verification processing. During proof of verification processing, aspects of a current session (e.g., current or active log data) may be evaluated independently or in comparison with related aspects identified from previous sessions of access (e.g., previous log data) by the subscriber.

More than one computing node, of the plurality of computing nodes 206, may be utilized to evaluate session data. In doing so, individual nodes may be randomly assigned, by the proof of verification protocol, to evaluate different aspects of session data. Examples of ways in which session data is evaluated comprise but are not limited to: multi-factor authentication of the subscriber through one or more computing devices (or modalities) of the subscriber that are registered with an exemplary application/service; comparing geo-locational data associated with a request in a current session with current geo-locational data of a registered computing device of the subscriber; matching characteristics of a current session with characteristics from previous sessions (through log data associated with previous subscriber access to the application/service and validating a nonce value associated with an active session of the application/service, among other examples. As referenced in the foregoing description, registered user computing devices may be utilized during proof of verification processing to validate common data access transactions relating to user data in validation of either subscriber data or session data.

Continuing process flow 200, if the plurality of computing nodes 206 reaches a consensus, through validation of the application data 208 (e.g., the subscriber data and the session data), then the proof of verification protocol is configured to interface with an exemplary blockchain protocol to execute processing operations for update 212 of a distributed ledger 214. An exemplary distributed ledger 214 is used for management of validated common data access transactions as described in the description of layer diagram 100 (FIG. 1). Operation to update 212 the distributed ledger 214 may comprise adding a block (e.g., an encrypted block) for the validated common data access transaction to distributed ledger 214. An exemplary distributed ledger 214 may be distributed, for example, within an entity providing record of states of transactions, relationships with subscribers, states of user data, activity record within an application/service and ownership/rewards/currency, among other examples. In some examples, an exemplar distributed ledger 214 may be made publicly available to the subscriber 210. For instance, the distributed ledger 214 may be encrypted, where a subscriber 210 can use its security token to recall states of user data (and previously recorded transactions).

Figure 3:
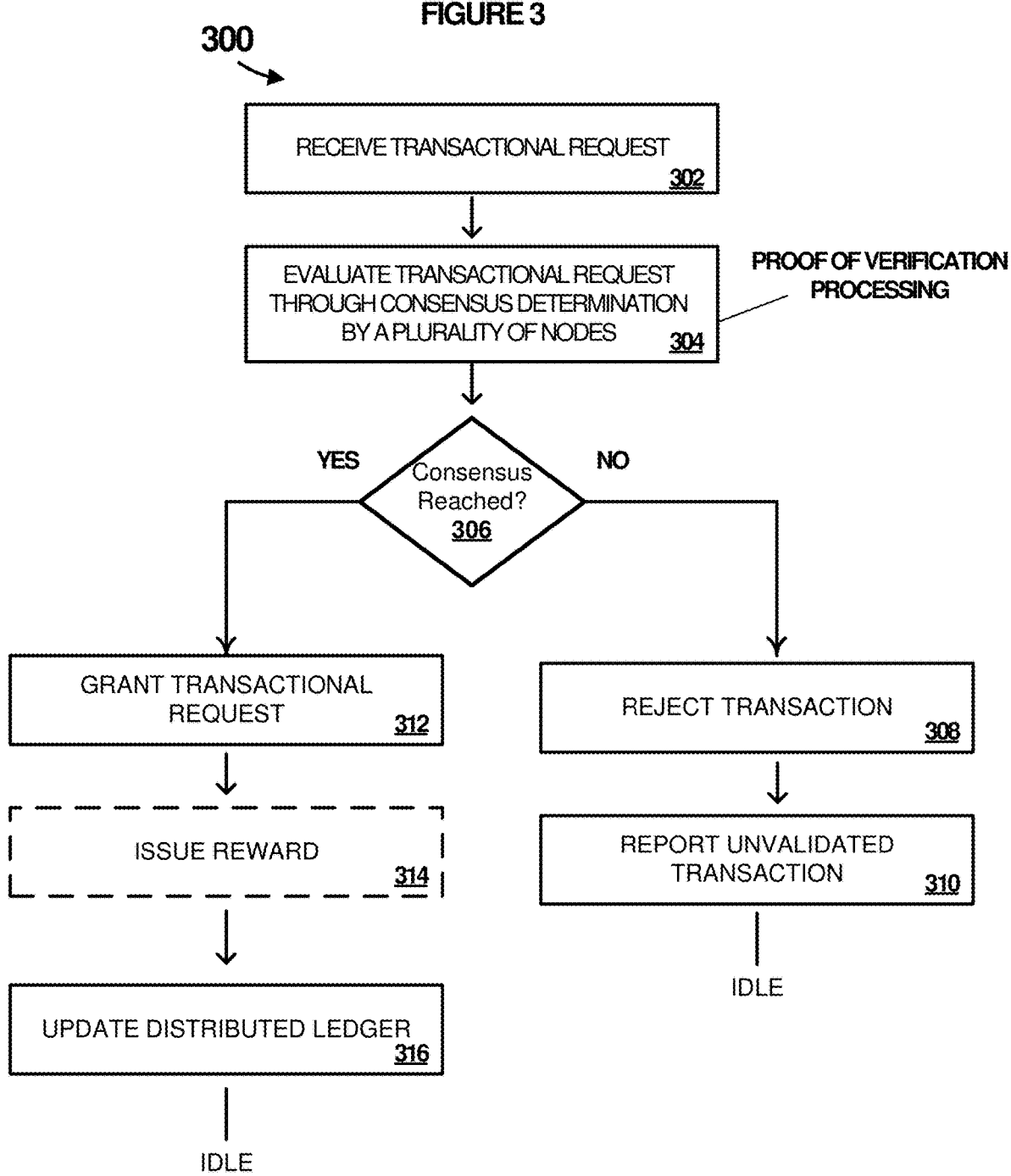
FIG. 3 illustrates an exemplary method related to verification of access to user data in a distributed network environment, with which aspects of the present disclosure may be practiced.

FIG. 3 illustrates an exemplary method 300 related to verification of access to user data in a distributed network environment, with which aspects of the present disclosure may be practiced. Processing operations described in method 300 may be executed by components of exemplary layers described in layer diagram 100 (FIG. 1) as well as comprise operations described in process flow 200 (FIG. 2), for example, relating to proof of verification processing. As an example, method 300 may be executed across an exemplary computing system (or computing systems) as described in the description of FIG. 4. Exemplary components, described in method 300, may be hardware and/or software components, which are programmed to execute processing operations described herein. Operations performed in method 300 may correspond to operations executed by a system and/or service that execute computer programs, software agents, intelligent bots, application programming interfaces (APIs), neural networks and/or machine-learning processing, among other examples. In some examples, processing operations described in method 300 may be executed by one or more applications/services associated with a web service that has access to a plurality of application/services, devices, knowledge resources, etc. In one instance, processing operations described in method 300 may be implemented by one or more components connected over a distributed network.

Method 300 begins at processing operation 302, where a transactional request is received for evaluation. Examples of transactional requests have been provided in the foregoing description. In one example, an exemplary transactional request is a common data access transactional request, as described in the foregoing description including the description of layered diagram 100 (FIG. 1) and process flow 200 (FIG. 2). Exemplary common data access transactional requests may come from an exemplary subscriber (e.g., user of an application/service) itself or from another party seeking access to, use of, modification of, etc., user data associated with the subscriber. In one non-limiting example, a user may be making a request to change an operation schedule of a smart device in the home of the user. In another non-limiting example, an application/service may be requesting distribution of user-specific data of a subscriber.

Flow of method 300 may proceed to processing operation 304, where the received transactional request is evaluated through consensus determination by a plurality of nodes associated with a system and/or service. A received transactional request may be propagated to a plurality of nodes, which are configured to execute exemplary proof of verification processing of the received transactional request. For example, an exemplary proof of verification protocol is configured to propagate the transactional request to a plurality of nodes for proof of verification processing. Examples of computing nodes have been provided in the foregoing description. In one example, the plurality of nodes comprises a plurality of virtual nodes. In another example, the plurality of nodes may comprise physical computing nodes or a combination of physical computing nodes and virtual computing nodes. Processing operation 304 comprises execution of proof of verification processing as described in the foregoing description including the description of layered diagram 100 (FIG. 1) and process flow 200 (FIG. 2).

Flow of method 300 may proceed to decision operation 306. At decision operation 206, results of proof of verification processing (processing operation 304) may be evaluated through a consensus determination as specific in an exemplary proof of verification protocol. In examples where the consensus determination is unable to validate the transaction, flow of decision operation 306 branches NO and processing of method 300 proceeds to processing operation 308. At processing operation 308, the transaction request is rejected. A rejected transaction may be reported (processing operation 310). In one example, identification of an un-validated transaction request may be reported to an exemplary subscriber. Reporting (processing operation 310) of a rejected transaction may be used to provide alerts of suspicious behavior (e.g., alert subscribers as to the un-validated transaction request) and may also be used to improve operation of an application/service including minimization of security vulnerabilities.

In examples where the plurality of nodes come to a consensus determination that the transactional request is validated, flow of decision operation 306 branches YES and processing of method 300 proceeds to processing operation 312. Processing operation 312, comprises granting of the transactional request. Granting (processing operation 312) of the transactional request may comprise granting specified data access associated with the transactional request. As an example, exemplary common data access may be granted.

In some instances, an exemplary transactional request may correspond with issues of a reward. In such cases, method 300 may proceed to processing operation 314, where a reward is issued to a subscriber. As an example, when the data is to be accessed, used, sold, etc., applications/services would confirm the use with the individual user to prevent unauthorized use of user data. To incentive users to share, users can be provided with rewards for sharing data. As an example, rewards may be in-application awards or even currency based (e.g., monetary compensation, cryptocurrency). This may be useful in online gaming instances to not only protect user data but also enable reward access and perks for sharing data (e.g., that may be used for advertising or telemetric analysis).

Method 300 may continue to processing operation 316, where an exemplary distributed ledger is updated based on a validation of a transaction (transactional request). An exemplary distributed ledger as well as details on update to the distributed ledger, have been described in the foregoing description.

FIG. 4 illustrates a computing system 401 that is suitable for implementation of proof of verification processing Computing system 401, which is representative of any system or collection of systems in which the various applications, services, scenarios, and processes disclosed herein may be implemented. Examples of computing system 401 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 401 may be implemented as a single apparatus, system, or device or may be implemented in a distributed manner as multiple apparatuses, systems, or devices. For example, computing system 401 may comprise one or more computing devices that execute processing for applications and/or services. As an example, computing system 401 is an example of a computing device that may execute as one of the plurality of nodes that forms a consensus evaluation in exemplary proof of verification processing. An exemplary computing system 401 may also be configured to enable virtualized computing resources (e.g., one or more virtual machines) to execute thereupon. Computing system 401 may comprise a collection of devices executing processing for front-end applications/services, back-end applications/service or a combination thereof. Computing system 401 includes, but is not limited to, processing system 402, storage system 403, software 405, communication interface system 407, and user interface system 409. Processing system 402 is operatively coupled with storage system 403, communication interface system 407, and user interface system 409.

Processing system 402 loads and executes software 405 from storage system 403. Software 405 includes applications/services such as an application/service for proof of verification security 406 that is configured to execute exemplary proof of verification processing as described herein. Software 405 is representative of the processes discussed with respect to the preceding FIGS. 1-3. When executed by processing system 402, software 405 directs processing system 402 to operate as described herein for at least the various processes, operational scenarios, and sequences discussed in the foregoing implementations. Computing system 401 may optionally include additional devices, features, or functionality not discussed for purposes of brevity.

Referring still to FIG. 4, processing system 402 may comprise a micro-processor and other circuitry that retrieves and executes software 405 from storage system 403. Processing system 402 may be implemented within a single processing device but may also be distributed across multiple processing devices or sub-systems that cooperate in executing program instructions. Examples of processing system 402 include general purpose central processing units, graphical processing units, application specific processors, and logic devices, as well as any other type of processing device, combinations, or variations thereof.

Storage system 403 may comprise any computer readable storage media readable by processing system 402 and capable of storing software 405. Computing system 401 may further be configured to connect with a distributed storage (e.g., in a distributed network example) that is accessible over a network connection. In examples where computing system 401 operates one or more virtual resources, storage system 403 may be a distributed storage that is accessible over a network connection by computing system 401. Storage system 403 may further include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or other suitable storage media, except for propagated signals. In no case is the computer readable storage media a propagated signal.

In addition to computer readable storage media, in some implementations storage system 403 may also include computer readable communication media over which at least some of software 405 may be communicated internally or externally. Storage system 403 may be implemented as a single storage device but may also be implemented across multiple storage devices or sub-systems co-located or distributed relative to each other. Storage system 403 may comprise additional elements, such as a controller, capable of communicating with processing system 402 or possibly other systems.

Software 405 may be implemented in program instructions and among other functions may, when executed by processing system 402, direct processing system 402 to operate as described with respect to the various operational scenarios, sequences, and processes illustrated herein. For example, software 405 may include program instructions for implementing proof of verification security 406 that comprises one or more applications/services configured to execute exemplary proof of verification processing as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 405 may include additional processes, programs, or components, such as operating system software, virtual machine software, or other application software. Software 405 may also comprise firmware or some other form of machine-readable processing instructions executable by processing system 402.

In general, software 405 may, when loaded into processing system 402 and executed, transform a suitable apparatus, system, or device (of which computing system 401 is representative) overall from a general-purpose computing system into a special-purpose computing system customized to process note items and respond to queries. Indeed, encoding software 405 on storage system 403 may transform the physical structure of storage system 403. The specific transformation of the physical structure may depend on various factors in different implementations of this description. Examples of such factors may include, but are not limited to, the technology used to implement the storage media of storage system 403 and whether the computer-storage media are characterized as primary or secondary storage, as well as other factors.

For example, if the computer readable storage media are implemented as semiconductor-based memory, software 405 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 407 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 409 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 409. In some cases, the input and output devices may be combined in a single device, such as a display capable of displaying images and receiving touch gestures. The aforementioned user input and output devices are well known in the art and need not be discussed at length here.

User interface system 409 may also include associated user interface software executable by processing system 402 in support of the various user input and output devices discussed above. Separately or in conjunction with each other and other hardware and software elements, the user interface software and user interface devices may support a graphical user interface, a natural user interface, or any other type of user interface.

Communication between computing system 401 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

Reference has been made throughout this specification to "one example" or "an example," meaning that a particular described feature, structure, or characteristic is included in at least one example. Thus, usage of such phrases may refer to more than just one example. Furthermore, the described features, structures, or characteristics may be combined in any suitable manner in one or more examples.

One skilled in the relevant art may recognize, however, that the examples may be practiced without one or more of the specific details, or with other methods, resources, materials, etc. In other instances, well known structures, resources, or operations have not been shown or described in detail merely to observe obscuring aspects of the examples.

While sample examples and applications have been illustrated and described, it is to be understood that the examples are not limited to the precise configuration and resources described above. Various modifications, changes, and variations apparent to those skilled in the art may be made in the arrangement, operation, and details of the methods and systems disclosed herein without departing from the scope of the claimed examples.

What is claimed is:

1. A method comprising:
receiving, at a cloud-computing data management service, a transactional request for access to user data associated with a subscriber of one or more applications;
evaluating the transactional request through a consensus determination of a plurality of virtual nodes associated with the cloud-computing data management service;
validating the transactional request when the plurality of virtual nodes reaches a consensus that the transactional request is authenticated, wherein the plurality of virtual nodes reach the consensus determination through a proof of verification that evaluates, for the one or more applications, and across the plurality of virtual nodes: subscriber data, and previous and current session data for user activity associated with access by the subscriber to the one or more applications; and
granting access to the user data responsive to validation of the transactional request, wherein the user data is stored in one or more blocks of a distributed ledger, and wherein granting the access to the user data includes distributing the user data.

2. The method of claim 1, wherein the proof of verification comprises:
a validation, by at least one of the plurality of virtual nodes, of a security token associated with a subscriber of the one or more application; and
validations, by other virtual nodes of the plurality of virtual nodes, of the session data associated with subscriber access to the one or more applications.

3. The method of claim 2, wherein the security token comprises a cryptographic private key specific to the subscriber.

4. The method of claim 2, wherein the validations of the session data comprise multi-factor authentication of the subscriber through session data of the one or more applications.

5. The method of claim 4, wherein the multi-factor authentication of the subscriber comprises transmitting an authentication message, from one of the other virtual nodes of the plurality of virtual nodes, to the subscriber through the one or more applications, wherein validation requires the subscriber to confirm the authentication message.

6. The method of claim 4, wherein the validations of the session data, by other virtual nodes of the plurality of virtual nodes, comprises matching characteristics of a current session of the subscriber with characteristics of previous sessions by the subscriber.

7. The method of claim 4, wherein the validations of the session data, by other virtual machines of the plurality of virtual machines, comprises evaluating geo-locational data associated with a registered computing device of the subscriber in comparison with geo-locational data associated with the transactional request.

8. The method of claim 1, further comprising: updating a distributed ledger of transactions for the cloud-computing data management service based on a validation of the transactional request.

9. The method of claim 8, further comprising: issuing, through the one or more applications, a reward to a subscriber associated with the user data based on the validation of the transactional request, wherein the updating of the distributed ledger comprises recordation of the issued reward.

10. A system comprising:
a plurality of computing devices that are connected over a network connection;
a shared data layer that is configured as a decentralized data storage, wherein the shared data layer comprises:
a distributed data storage that stores user data across multiple blocks of a distributed ledger on a plurality of computing nodes, a blockchain layer that is configured to manage the distributed ledger of transactional access to the user data for one or more applications, and an overlay network that is configured to implement machine virtualization architecture over the plurality of computing devices, wherein the machine virtualization architecture comprises a plurality of virtual machines that are configured to control access to the distributed data storage;

a shared protocol layer that provides a protocol configured for:
   validation of a transactional request corresponding with the user data and management of the distributed ledger based on a result of the validation, wherein application of the protocol causes the plurality of virtual machines to execute a consensus determination of the transaction request through a proof of verification, and wherein the proof of verification evaluates, for the one or more applications: subscriber data, and previous and current session data for user activity associated with access by the subscriber to the one or more applications;
   an application programming interface layer that provides an application programming interface enabling the one or more applications to interface with the shared data layer and the shared protocol layer; and
   an application layer providing the one or more applications, wherein the transactional request is received, from a client node, through the one or more applications, and wherein the protocol is applied to evaluate the transactional request.

11. The system of claim 10, wherein the plurality of virtual machines executes in a cloud-computing environment.

12. The system of claim 10, wherein the subscriber data comprises a security token associated with a subscriber that corresponds with the user data, and wherein the proof of verification comprises: a validation of the security token by at least one of the plurality of virtual machines, and validations, by other virtual machines of the plurality of virtual machines, of the session data associated with subscriber access to the one or more applications.

13. The system of claim 12, wherein the security token comprises a cryptographic private key specific to the subscriber.

14. The system of claim 12, wherein the validations of the session data comprise multi-factor authentication of the subscriber through session data of the one or more applications.

15. The system of claim 14, wherein the multi-factor authentication of the subscriber comprises transmitting an authentication message, from one of the other virtual machines of the plurality of virtual machines, to the subscriber through the one or more applications, and wherein validation requires the subscriber to confirm the authentication message.

16. The system of claim 12, wherein the validations of the session data, by other virtual machines of the plurality of virtual machines, comprises matching characteristics of a current session of the subscriber with characteristics of previous sessions by the subscriber.

17. The system of claim 16, wherein the validations of the session data, by other virtual machines of the plurality of virtual machines, comprises evaluating geo-locational data associated with a registered computing device of the subscriber in comparison with geo-locational data associated with the transactional request.

18. The system of claim 10, wherein the blockchain layer is configured to update the distributed ledger based on a validation of the transactional request.

19. The system of claim 18, wherein the shared protocol layer is further configured to provide a rule set for issuance of a reward for a validated sharing of the user data, wherein an application of the rule set causes the reward to be issued, through the one or more applications, to the subscriber based on the validation of the transactional request, and wherein the update of the distributed ledger comprises an entry for issuance of the reward.

20. A system comprising:
   a plurality of smart devices in a building infrastructure, wherein the plurality of smart devices is connected over a network connection;
   a shared data layer that comprises a decentralized storage for data associated with the plurality of smart devices, where the shared data layer comprises:
   a blockchain layer that is configured to manage a distributed ledger of transactional access to data for one or more applications associated with the plurality of smart devices, and an overlay network that is configured to implement machine virtualization architecture for the plurality of computing devices, wherein the machine virtualization architecture comprises a plurality of virtual nodes that are configured to control access to the distributed ledger;
   a shared protocol layer that provides a protocol configured for: validation of a transactional request for operation of one of the plurality of smart devices, wherein application of the protocol causes the plurality of virtual nodes to execute a consensus determination of the transaction request through a proof of verification, and wherein the proof of verification evaluates, for the one or more applications:
   subscriber data, and previous and current session data for user activity associated with access by the subscriber to the one or more applications, to validate the transactional request; an application programming interface layer that provides an application programming interface enabling the one or more applications to interface with the shared data layer and the shared protocol layer; and an application layer providing the one or more applications, wherein the transactional request is received through the one or more applications, and wherein the protocol is applied to evaluate a validity of the transactional request.

* * * * *